Figure 1:
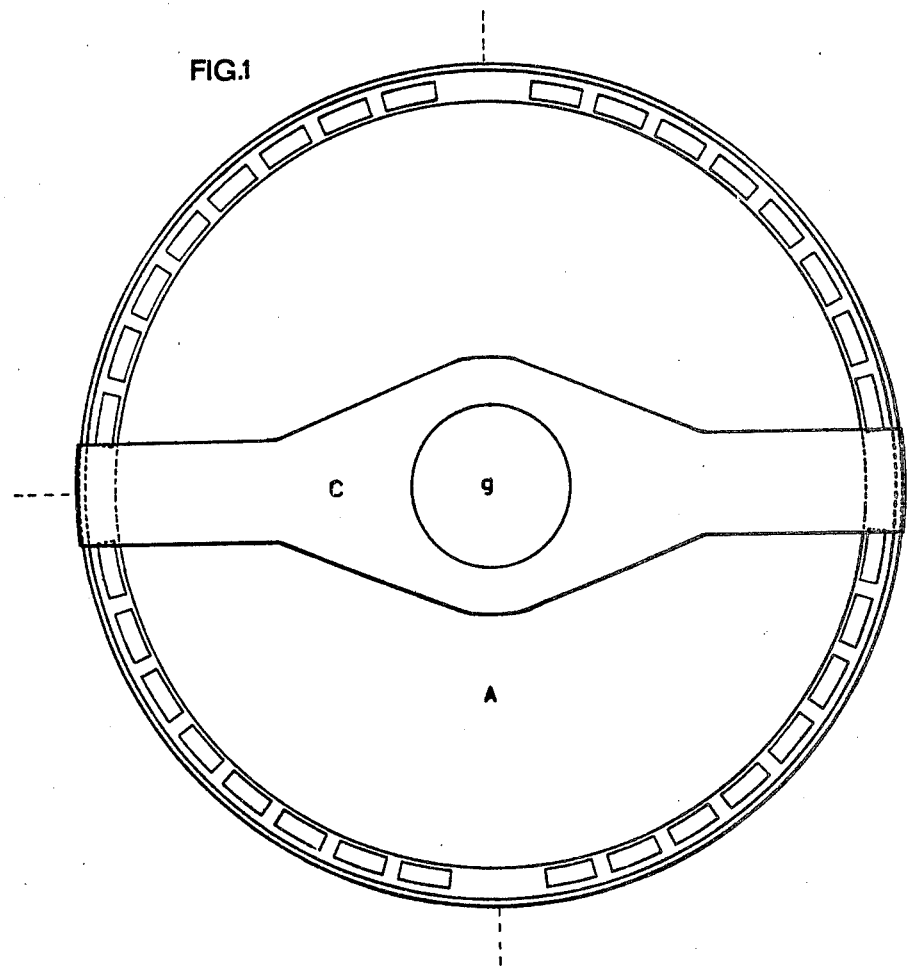

United States Patent [19]

Costanzo

[11] 4,154,022
[45] May 15, 1979

[54] CONTAINER FOR PLANTS INCLUDING AN APPROXIMATE AGE INDICATION CROSSPIECE

[76] Inventor: Nicola Costanzo, Via Monteforte Irpino, 12, Rome, Italy

[21] Appl. No.: 801,782

[22] Filed: May 31, 1977

[30] Foreign Application Priority Data

May 31, 1976 [IT] Italy .................. 49721 A/76

[51] Int. Cl.² ............................................. A01G 9/02
[52] U.S. Cl. ........................................ 47/66; 47/32; 47/73
[58] Field of Search ............... 47/32, 73, 74, 77, 78, 47/84, 70, 66, 25

[56] References Cited

U.S. PATENT DOCUMENTS

| 2,017,308 | 10/1935 | Elmer | 47/32 X |
|---|---|---|---|
| 2,930,162 | 3/1960 | Mulford | 47/78 |
| 2,945,323 | 7/1960 | Pratt | 47/77 |
| 3,184,890 | 5/1965 | McKey | 47/73 |
| 3,961,443 | 6/1976 | Insalaco | 47/32 |
| 4,040,208 | 8/1977 | England | 47/70 X |

FOREIGN PATENT DOCUMENTS

| 122561 | 7/1901 | Fed. Rep. of Germany | 47/84 |
|---|---|---|---|
| 2112753 | 6/1972 | France | 47/77 |
| 1187620 | 4/1970 | United Kingdom | 47/84 |
| 1284768 | 8/1972 | United Kingdom | 47/32 |

*Primary Examiner*—Edgar S. Burr
*Assistant Examiner*—Steven A. Bratlie
*Attorney, Agent, or Firm*—J. Harold Nissen

[57] ABSTRACT

A container for the cultivation of little wooden nursery plants, which container is composed of a material derived from hydrocarbons, as for example polyvinyl chloride (pvc), characterized in that across the opening of the same passes a crosspiece with a central hole, also having vertical and horizontal bands that are needed to hold the container in an erected position, which new container has many important functions: to help the little plant to grow, but favoring the extension of the lateral roots, while the main-root will be atrophized, finding on the closed end of the container an obstacle that blocks its growth, and therefor avoiding the cutting of the main-root; to indicate to the purchaser the approximate age the plant has reached in the nursery, from the seeding up to the selling; to protect the roots by preserving around them the clod of original earth.

10 Claims, 3 Drawing Figures

CONTAINER FOR PLANTS INCLUDING AN APPROXIMATE AGE INDICATION CROSSPIECE

Container for underground cultivation of plants in a seedling nursery, and for the selling of the same, with an indication to a prospective purchaser that the plant in the container is less than a pre-selected or particular age to assure to the prospective purchaser than the plant in the container is less than a particular or pre-selected age to provide an assurance of the surviving and its age.

The present invention concerns a container for underground cultivation of plants in a seedling nursery, for the selling of the same with assurance of their surviving and age.

It is well known, in the production of little wooden plants in seedling nurseries (vegetables, olive-trees, spruces etc.), that the main-root always tends to grow vertically downwards into the soil to the detriment of the lateral roots; when the plants are weeded out, together with the surrounding earth, it is necessary to cut the main root. In addition, it is also necessary to cut the secondary or other roots with a consequent removal shock and a great probability that the plant will die. It is to be added that the weight of the weeded-out clod will be damaged particularly if it is a little clod, and furthermore the remaining roots are also damaged. Finally, it is evident that the purchaser will never know the real age that the plant has reached in the seedling nursery.

Actually, the little nursery wooden plants are cultivated and sold in different ways all of which have disadvantageous aspects for the economy of the nursery.

Actually, the cultivation of plants in seedling nurseries takes place in the following way:

(a) cultivation in full earth with weeding-out to bare root; soft and sandy soils are required, to reduce the damages to the roots when they are weeded out. These soils cause a greater growth of the main-root deeper into the soil;

(b) cultivation in full earth with weeding-out together with the clod; argillaceous soils and moody nature are required, that assure the compactness of the clod when it is weeded-out. Specialized workers weed out the plant from the earth, with the help of a spade and other tools. A clod having a cylindrical configuration is removed, and the clod is tied by hand with strings of different kinds, or envelopped in straw or in nets of different kinds. Even if a part of the original earth remains around the roots—but always little, for reasons of transportation—the weeding-out shock is even greater in this case since the lateral roots, besides the main root, are cut, too. Furthermore, the argillaceous and moody nature of the ground provokes a stanching of the water, that may cause the roots to become rotten. When the plants are put in softer soils, of calcareous nature, the remaining clod hardens around the root-stumps and blocks the extension of new capillary roots. Finally, a double transplantation cost will arise and the probabilities of death of the plant, caused by the transplantation, are not excluded.

(c) cultivation and selling in containers: in these cases containers, an vases of "terracotta", of soft or rigid plastic material, closed or pierced, or the so-called "fitocells", i.e. little bags of black plastic material, flabby and with little holes are used; the defects that can be found in this case are even more evident. In fact, the rigid vases of plastic materials or the vases of "terracotta" are inconvenient during transport of the plants. The plastic vases are cumbersome, and the "terracotta" vases break very easily. All these containers including the "fitocells", block the horizontal growth of the roots, that tend to find a way out from the top of the container and are therefore subjected to distorsions, neither is the problem of the main-root solved, as it comes out from the bottom of the container and therefore has to be cut. The increase labor costs which result when "fitocells" are used should be added. When the "fitocells" are used, and the plants have to be transplanted, the plants have to be maintained in an erect or upright position by one worker and the "fitocells" must be filled up by another worker. Moreover, the "fitocells" cannot be filled up by a mechanical process.

The aims of the present invention are: to remove some of the aforesaid inconveniences and to provide a container which is useful to avoid cutting of the main root;

to assure the survival of the plant so that it can be sold;

to assure the protection of the roots by preserving the clod of original earth which surrounds the roots;

to assure a remarkable savings and operations of transplantation; and, to indicate the age the plant has reached in the seedling nursery to the purchaser. The present invention achieves the aforesaid aims by providing a container useful for both underground cultivation of nursery plants and the sale of the same. The container is flexible, elastic of nearly tubular form, and has a closed and compact base together with a lateral (or vertical) surface having holes of any form. The container is fabricated from a material obtained from hydrocarbons, such as for example polyvinyl chloride (pvc). The upper part of the container is provided with a crosspiece having a central hole. The diameter of the central hole is chosen so that it is in proportion to the dimension that the stalk of the plant will reach after some preselected years or a particular period of time, so that the container with the crosspiece can be used to indicate the cultivation age of the plant in the nursery.

This container has a closed end to block artificially the growth of the main-root; the lateral surface is a network, or it is provided with holes of any form that allow the roots to spread horizontally and is strengthened by a number, generally four, of vertical, entire bands (I.e. without holes), that connect the upper edge to the end, and two horizontal bands, at the upper part near the opening, and at the lower part near the end above the opening a cross-piece is provided with, at the middle, a hole with a triplex function: to have the little plant centered better when, after a period after the seeding it will be put into the container, to assure the position of the stalk during the various transportation operations, to indicate the age of the plant at the moment it is sold.

This special container allows therefore an underground cultivation in earth of wooden nursery plants and a conditioned, slow and progressive development of the roots from the seeding moment up to the time of selling. The main root does not continue to grow because it encounters the closed and rigid base (end) which forms an obstacle to its continued growth, and it cannot continue in the earth its search for water and nutritive substances. Therefore, the main-root loses its vigor and atrophies. In any case, the plant will not suffer by this loss in its development and will not even suffer a shock, as in the case in which this root is suddenly cut. This atrophying is in any case only an advantage for the lateral roots, which may now develop in all directions in the fertile humus surrounding them, through the holes of the container. In this way it is avoided, when the plant is sold or when it is transplanted, the cutting of the main-root as well as that of the lateral roots, which will hang from the container without being cut; this way the complete and immediate growth of the plant will be favoured, as well as a great vegetative retaking.

The object of the invention will be now described referring to a preferred embodiment, which is not limitative, illustrated in the enclosed drawings.

Figure 2:
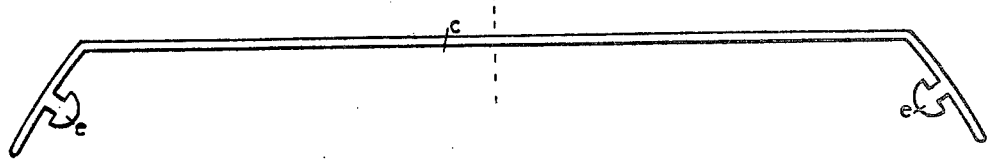
Figure 3:
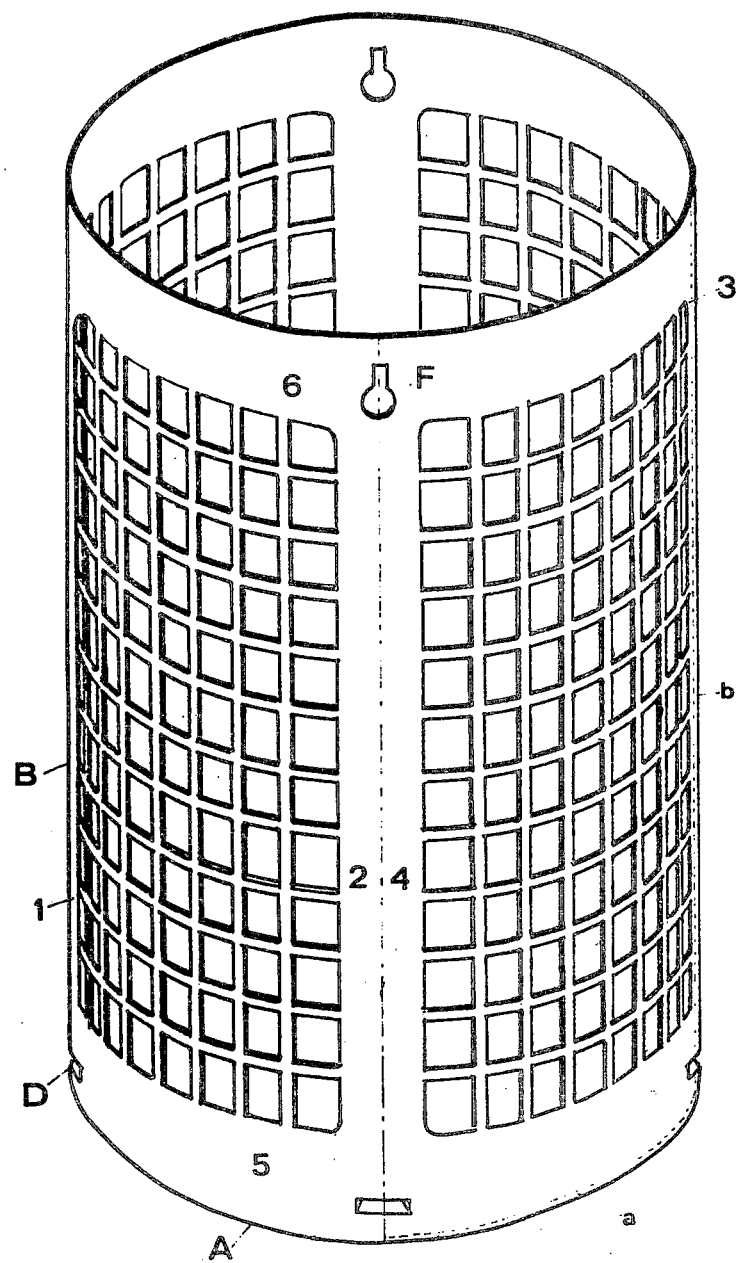

FIG. 1, shows a top-view of the container, according to the invention;

FIG. 2, a longitudinal section of the crosspiece;

FIG. 3 is a perspective view of the container according to the invention with the crosspiece of FIG. 2 omitted.

In FIG. 1, A indicates the end C shows the age indication crosspiece when the same is fixed at the upper edge; g shows the hole for the control of the dimension of growth of the stalk, that can be varied according to the future species and bigness of the stalk of the plant that is to be cultivated.

In FIG. 2, c shows the section of said crosspiece with the two hooks e to fix the same at the upper edge.

In FIG. 3 the four entire, vertical bands, that are needed for the reinforcement, are indicated with 1, 2, 3 and 4, as well as the two horizontal entire bands, that are needed for the reinforcement, too, and indicated by 5 and 6. At the bottom of band 5, in correspondence with the four vertical bands, the drainage holes are indicated with D, while on the band 6 of the edge are indicated with f the holes for the fixing of the age indication crosspiece-hooks. A and a show respectively the end and its section.

The material of which the container is composed allows the same to remain open and erected by itself so as to be filled up with earth directly in the parallel tracks of an automatic device, that works quicker and with a lower expense of labor; its flexibility avoids all the costs that might arise during the transportation of the plants, when the vases or the clod might crash, with the consequent loss of the plant.

The tubular form, with a minimal difference of diameter between the top and the bottom opening, openings that can be of circular or quadrangular form, together with the lightness of the material, reduce the transport costs, as the plants can be prepared for the transport, put in line as well as piled up in a room smaller than that one that would be required for the traditional vases of truncated-cone form.

The end A, closed and rigid, blocks, during the development of the plant in earth, the excessive development in depth of the main-root, atrophizes the same to the advantage of the lateral roots, avoiding in this way the transplantation-shock.

The lateral surface, provided with holes of any form, facilitates the spreading of the lateral roots and their diffusion in the surrounding earth; the four bands, that are vertical and opposed, 1, 2, 3 and 4 and the two horizontal bands 5 and 6, give stiffness, in the upper part, near the opening and in the lower part near the end A, to the container, protect and cage the clod and the roots during the cultivation and during the many movements at selling.

The age indication crosspiece C, placed along the opening diameter of the container, and that can be fixed from both external sides of this diameter by means of fixedjoint hooks e that penetrate into the correspondingly shaped holes f, provided in the container, is provided with a central hole g, which can vary in diameter, proportioned to the dimension that the stalk of the plant will have reached after some years, assuring in this way the age at the selling; this crosspiece allows, furthermore, to center very precisely the plant and to fix securely the clod at the stalk at the moment of the weeding-out and during the transportation, protecting this way the roots from damages. Finally, the object of the invention has the advantage that the cultivation in nurseries can be extended to soils that are different from the compact-moody-argillous ones, that have been necessary until now for the weeding-out of the plants together with their clod, reducing the high cost of lacking specialized labor in the field of nurseries, eliminates completely the costs of packing material and, most of all, extends the selling period of nursery plants even in summer months.

I claim:

1. A container for the underground cultivation of nursery plants in soil and for the selling of the plants with an indication seal to assure to a prospective purchaser that the plant in the container is less than a particular or pre-selected age, comprising:
   a base,
   a vertically extending flexible elastic wall having an upper portion and a lower portion connected with said base adapted to hold a growing medium suitable for the growth of plants, and
   means for indicating to a prospective purchaser the age of the plant relative to said pre-selected age including a crosspiece connected across said wall to said upper portion thereof away from said base,
   said crosspiece having an opening and including a continuous wall surrounding said opening, said crosspiece being adapted to overlie the growing medium so that a seed or a seedling placed thereinto and centered within said opening will grow through said opening and have its stalk surrounded by said continuous wall, the diameter of said opening being pre-selected in accordance with the approximate diameter of the stalk at the pre-selected age of the plant, whereby the existence of a free space between the stalk and said continuous wall surrounding said opening indicates to the prospective purchaser that said plant is less than said preselected age.

2. The container as claimed in claim 1, wherein said vertically extending wall between said upper and said lower portions includes a pair of lateral surfaces each provided with a plurality of openings to permit the spreading of the roots.

3. The container as claimed in claim 2, wherein said vertically extending wall includes stiffeners between said pair of lateral surfaces.

4. The container as claimed in claim 3, wherein said upper and said lower portions each includes a stiffener.

5. The container as claimed in claim 1, wherein said base is a solid base to prevent the growth of the main root of said plant and thereby atrophy said main root and facilitate the development of the lateral roots.

6. The container as claimed in claim 5, wherein said upper portion and said lower portion each includes a reinforcement band surrounding said vertically extending wall.

7. The container as claimed in claim 6, including
at least two diametrically opposed vertically extending spaced reinforcement bands extending between said upper and said lower portions on said vertically extending wall, and
said vertically extending wall including at least two networks having a plurality of openings.

8. The container as claimed in claim 7, including means fixing said crosspiece at said upper portion aligned with said vertically extending reinforcement bands.

9. The container as claimed in claim 7, including four of said vertically extending reinforcement bands, one of said networks being positioned between each pair of said vertically extending bands.

10. The container as claimed in claim 5, wherein said vertically extending wall and said base is made from a polyvinyl chloride material, and said lower portion includes at least one drainage opening.

* * * * *

UNITED STATES PATENT AND TRADEMARK OFFICE
CERTIFICATE OF CORRECTION

PATENT NO. : 4,154,022
DATED : May 15, 1979
INVENTOR(S) : Nicola COSTANZO

It is certified that error appears in the above-identified patent and that said Letters Patent are hereby corrected as shown below:

Col. 1  delete first two paragraphs and substitute therefor:

The present invention concerns a container for underground cultivation of plants in a seedling nursery, and for the selling of the same with an indication to a prospective purchaser that the plant in the container is less than a pre-selected or particular age to assure to the prospective purchaser that the plant in the container is less than a particular or pre-selected age to provide an assurance of the plant surviving and its age.

Col. 1, Line 36  delete "to" and insert --at--

Line 39  delete "greater" and insert --stronger--

Line 63  after "containers" delete "an" and insert --as--

Col. 2, Line 68  after "loss" insert --of strength--

Col. 3, Line 42  delete "of" and insert --with--

UNITED STATES PATENT AND TRADEMARK OFFICE
CERTIFICATE OF CORRECTION

PATENT NO. : 4,154,022
DATED : May 15, 1979
INVENTOR(S) : Nicola COSTANZO

It is certified that error appears in the above-identified patent and that said Letters Patent are hereby corrected as shown below:

Col. 3, Line 42 delete the comma and insert --for filling up--

Signed and Sealed this

Fourth Day of November 1980

[SEAL]

Attest:

SIDNEY A. DIAMOND

Attesting Officer

Commissioner of Patents and Trademarks